April 29, 1958 — J. G. INGRES — 2,832,316
BOOSTER BRAKE MECHANISM
Filed Sept. 28, 1953 — 3 Sheets-Sheet 1

INVENTOR
JEANNOT G. INGRES
BY John F. Phillips
ATTORNEY

April 29, 1958   J. G. INGRES   2,832,316
BOOSTER BRAKE MECHANISM
Filed Sept. 28, 1953   3 Sheets-Sheet 2

INVENTOR
JEANNOT G INGRES
BY John F. Phillips
ATTORNEY

April 29, 1958   J. G. INGRES   2,832,316
BOOSTER BRAKE MECHANISM
Filed Sept. 28, 1953   3 Sheets-Sheet 3

INVENTOR
JEANNOT G. INGRES
BY John F. Phillips
ATTORNEY

United States Patent Office 2,832,316
Patented Apr. 29, 1958

2,832,316

BOOSTER BRAKE MECHANISM

Jeannot G. Ingres, Dearborn, Mich., assignor to Kelsey-Hayes Company, a corporation of Delaware Application September 28, 1953, Serial No. 382,717

10 Claims. (Cl. 121—41)

This invention relates to a booster brake mechanism for motor vehicles.

Most manufacturers of passenger motor vehicles using booster brakes prefer an installation wherein initial pedal movement to set the brake shoes against the brake drums takes place with a minimum amount of effort on the part of the operator. Such a mechanism provides what is known in the industry as a "soft pedal." Such an arrangement has been accomplished in the past in a number of different ways. For example, some installations accomplish this by providing lost motion between a pedal operated rod and an internal plunger operating in conjunction with a surrounding sleeve to constitute a fluid displacing unit operable in the master cylinder. Many of these installations, however, are quite expensive to build.

In my copending application Serial No. 364,346, filed June 26, 1953, now Patent No. 2,790,306, issued April 30, 1957, I have disclosed a novel type of booster brake mechanism wherein the pressure responsive unit of the booster motor is formed in two relatively movable parts one of which is connected to a single solid fluid displacing plunger extending into the master cylinder. Relative movement of the two parts referred to occurs incident to fluid pressure reactions against the fluid displacing plunger and such relative movement reacts through novel lever means against the pedal operated rod to provide the brake pedal with the proper "feel." In the structure of my copending application referred to, only one part of the pressure responsive unit responds to pressure variations in the booster motor and initial movement of such pressure movable part is transmitted to the fluid displacing plunger solely through the action of springs interposed between the two parts.

An important object of the present invention is to provide a booster wherein the pressure movable mechanism of the booster motor comprises separate units both responsive to differential pressures in the motor, one of such separate units being connected to the fluid displacing plunger to immediately transmit forces thereto upon energization of the motor.

A further object is to provide such a booster motor wherein the two units of the pressure responsive mechanism are connected by a flexible diaphragm to provide for relative movement of the two units, and to provide novel lever means between the two units operable upon predetermined movement therebetween after the building up of a predetermined pressure in the master cylinder for reacting against the brake pedal to provide the latter with "feel."

A further object is to provide such a mechanism wherein one unit of the pressure movable mechanism is directly connected to the fluid displacing plunger while the other unit transmits forces to the first-mentioned unit through the action of a spring the tension of which will determine the differential pressures in the motor at which the lever reaction means becomes effective for transmitting "feel" reactions to the brake pedal.

A further object is to provide such an apparatus which permits the use of a "soft pedal" and improves and smooths out the entire operation of the booster mechanism.

Other objects and advantages of the invention will become apparent during the following description.

In the drawings I have shown one embodiment of the invention. In this showing:

Figure 1:
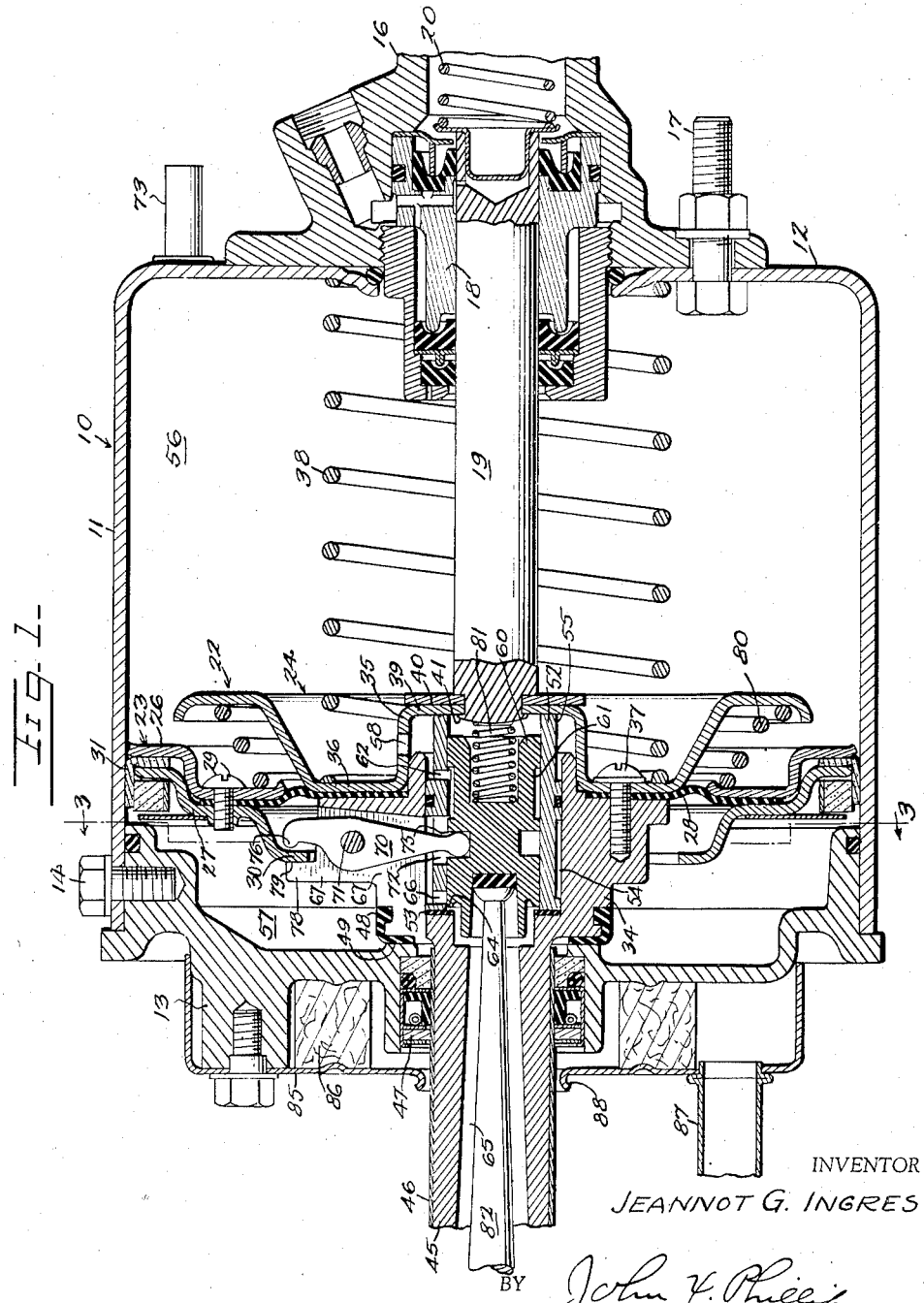
Figure 1 is a central longitudinal sectional view through the booster mechanism showing a part of the master cylinder and a part of the pedal operated rod for operating the booster mechanism, the valve device being shown slightly unseated from its off position prior to energization of the booster motor.

Referring to the drawings, the numeral 10 designates a booster motor as a whole comprising a cylinder 11 closed at one end as at 12 by a preferably integral head and provided at its opposite end with a preferably cast head 13 secured to the cylinder 11 as at 14.

Figure 2:
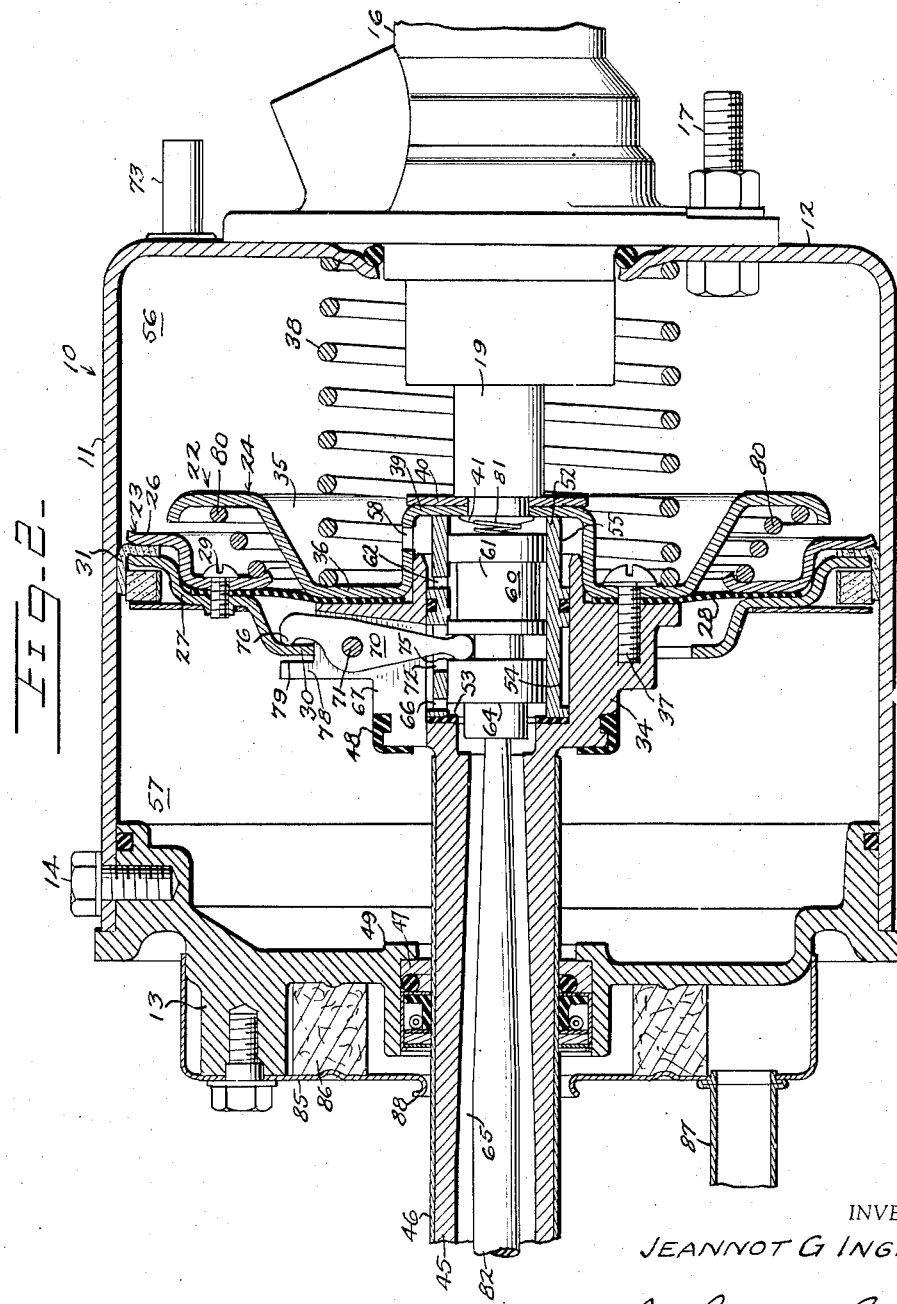
Figure 2 is a similar view showing the parts substantially in fully applied brake positions.

The head 12 carries a master cylinder 16 bolted thereto as at 17 and carrying suitable bearing and sealing means 18, forming no part of the present invention, in which is slidable a fluid displacing plunger 19 biased toward the left in Figures 1 and 2 by the usual spring 20 in the master cylinder.

A pressure movable mechanism indicated as a whole by the numeral 22 is mounted for reciprocation in the cylinder 11. This mechanism comprises a pair of units respectively indicated as a whole by the numerals 23 and 24. The unit 23 comprises a pair of plates 26 and 27 having clamped therebetween an annular diaphragm 28 further referred to below, the plates 26 and 27 being secured together by screws 29. The plate 27 has its inner annular edge portion offset inwardly to form a flange 30 for a purpose to be described. The plates 26 and 27 also clamp therebetween a cup 31 reciprocable against the wall of the cylinder 11, the particular formation of this cup and the elements associated therewith forming no part of the present invention.

The movable unit 24 comprises a preferably cast body 34 and a pressed plate 35 having a wall 36 thereof arranged in a plane perpendicular to the axis of the motor and cooperating with the adjacent surface of the cast body 34 to clamp therebetween the annular inner edge portion of the diaphragm 28. The plate 35 is secured to the body 34 by screws or other fastening elements 37. A return spring 38 is arranged in the cylinder 11. The ends of this spring respectively engage the plate wall 36 and the head 12 to bias the pressure movable mechanism 22 to the off position shown in Figure 1. The plate 35 includes an end wall 39 backed up by a stiffening washer 40, and these two elements surround the adjacent end of the plunger 19 and are fixed thereto by peening the plunger 19 as at 41.

The cast body 34 is provided with a sleeve extension 45 extending through the head 13 and preferably surrounded by a stainless steel or similar smooth sleeve 46 operable in suitable bearing and sealing means 47 carried by the head 13. The body 34 carries an annular bumper 48 of resilient material engageable against a shoulder 49 on a head 13 to limit movement of the mechanism 22 to the off position shown in Figure 1 and to silence its movement to such position.

A stationary valve sleeve 52 is mounted in the body 34 and is held seated against a resilient seal 53 by the end wall 39 of the plate 35. The valve sleeve 52 is provided with a pair of annular elongated peripheral grooves 54 and 55. The pressure movable mechanism 22 divides the motor into a constant pressure chamber 56 and a variable pressure chamber 57 the former of which is always in communication with the groove 55 through a port 58 in the plate 35.

A spool valve 60 is slidable in the sleeve 52 and is provided with an annular groove 61 which is always in communication with the groove 55 of the sleeve 52 through a port 62 in such sleeve. The spool valve 60 is provided at its left-hand end in Figures 1 and 2 with an annular valve element 64 engageable with the seal 53 when the valve 60 is in its off position slightly to the left of the position shown in Figure 1.

The sleeve 45 forms a chamber 65 which is sealed from the interior of the motor when the valve element 64 is seated. Movement of this valve element to the right opens communication with the variable pressure chamber 57 through a port 66 in the sleeve 52, such port being in communication with the groove 54 and in communication with the chamber 57 through a plurality of radial grooves 67 provided in the body 34 for a purpose to be described.

Figure 3:
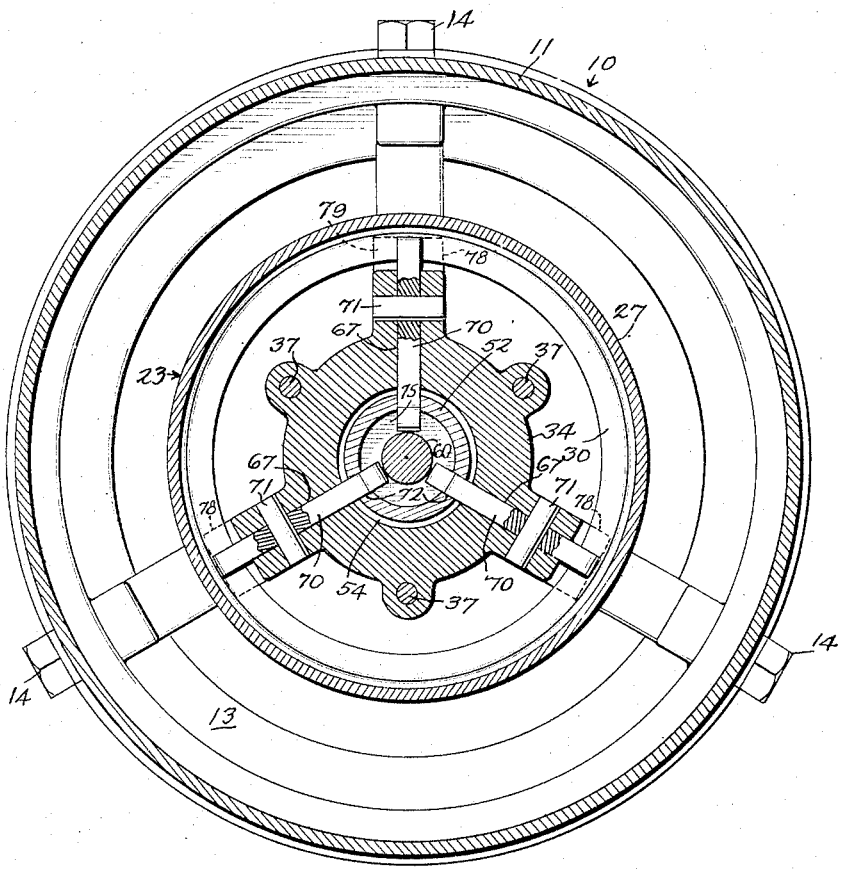
Figure 3 is a transverse sectional view taken substantially on line 3—3 of Figure 1.

In each of the radial slots 67 is arranged a lever 70 pivoted to the body 34 as at 71 (see Figure 3). The inner end of each lever 70 projects through an opening 72 in the sleeve 52, each opening 72 being elongated longitudinally of the sleeve 52 as shown in Figures 1 and 2. The openings 72 constitute ports affording communication between the valve groove 61 and the variable pressure chamber 57 when the valve 60 is in its off position. In such position, the groove 61 serves to establish communication between the motor chambers 56 and 57 to balance pressures therein. In the present instance the motor is shown as being vacuum operated and the cylinder head 12 is provided with a nipple 73 adapted for connection with a source of vacuum such as the intake manifold. With the parts in the off positions, therefore, the motor will be vacuum suspended.

Each lever 70 has its radially inner end projecting through one of the openings 72 and thence into an annular groove 75 formed in the valve 60, the inner end of each lever being rounded as shown in Figures 1 and 2. The radially outer end of each lever 70 is provided with a contact point 76 engageable, under conditions to be described, with the flange 30. At the radially outer end of each slot 67, the body 34 is provided with a radial projection 78 forming a shoulder 79 engaged in the off positions of the parts by the flange 30 under the biasing influence of a spring 80 interposed between the plates 26 and 35 as shown in Figures 1 and 2. Under such conditions, the contact points 76 of the levers 70 are disengaged from the flange 30.

The spool valve 60 is biased to its off position by a spring 81 interposed between the spool valve and the plunger 19. This spring is relatively light and the force thereof is easily overcome upon a brake actuating movement of a rod 82 connected to the conventional brake pedal (not shown).

The space or chamber 65 may directly communicate with the atmosphere, but it is preferred that the air passing to the chamber 65 be cleaned. To this end, a shell 85 is fixed to the head 13 and houses an air cleaner 86 to which air may be supplied through a nipple 87. In accordance with established practice, the shell 85 may be provided with a flange 88 to which is connected one end of a longitudinally collapsible boot (not shown) the other end of which is connected to the rod 82.

*Operation*

The pressure responsive mechanism 22 normally occupies the off position shown in Figure 1 with the bumper 48 in engagement with the shoulder 49. The valve 60, in its off position, is slightly to the left of the position shown in Figure 1 with the valve element engaging the seal 53. The valve is biased to such position by the spring 81, and accordingly the port 66 will be sealed from the atmosphere. During the operation of the device as described below, there necessarily will be some slight leakage between the sliding surfaces of the valve 60 and sleeve 52, which is unavoidable in a valve of this type, but this leakage will be negligible and will not affect the operation of the mechanism. It is desirable, however, that there be no normal leakage, that is, leakage when the parts are in the off position, hence the provision of the seal 53.

The return spring 38 engages the plate 35 and accordingly biases the entire pressure responsive unit 22 to the left with the bumper 48 engaging the shoulder 49, as stated. The biasing spring 80 holds the pressure responsive unit 23 at its left-hand limit of movement with the flange 30 engaging the shoulders 79.

When the brakes are to be applied, the operator will depress the brake pedal (not shown) to effect movement of the rod 82 to the right, initially solely against the tension of the relatively light spring 81. The motor will have been vacuum-suspended in the manner stated above, and initial movement of the rod 82 carries the spool valve 60 to the position shown in Figure 1 and then slightly beyond such position until the left-hand extremity of the groove 61 (Figure 1) coincides with the right-hand extremities of the openings 72, at which time the valve 60 will be in its lap position. Slight movement of the valve 60 to the right beyond its lap position completely disconnects groove 61 from communication with the motor chamber 57 and "cracks" the port 66, and air flows from chamber 65 into the motor chamber 57 to raise the pressure therein. Differential pressures thus will be established on opposite sides of the pressure movable mechanism 22, and these differential pressures will affect both of the units 23 and 24, and both will start to move to the right from the position shown in Figure 1. Differential pressures affecting the unit 24 will be positively transmitted to the plunger 19 which moves into the master cylinder 16 to displace fluid therefrom into the brake lines of the vehicle. Differential pressures affecting the unit 23 will be resiliently transmitted to the unit 24 through the spring 80 to add to the force moving the plunger 19.

During the initial movement referred to, little resistance will be encountered in displacing fluid from the master cylinder, this resistance being due to that encountered in opening the usual residual pressure valve and to the usual line resistances. These resistances, however, will be weaker than the force of the spring 80 in the initial operation of the device, and accordingly the flange 30 will remain in engagement with the shoulders 79.

As pressure increases in the master cylinder 16 incident to pressure of the brake shoes against the drums, there will be increased resistance to movement of the plunger 19 toward the right in Figure 1. This plunger is rigidly fixed to the unit 24 but not to the unit 23, and when the resistance to movement of the plunger 19 exceeds the force of the spring 80, pressure in the motor chamber 57 will move the unit 23 toward the right relative to the unit 24, the spring 80 being compressed in such movement. As the flange 30 then moves to the right away from the shoulders 79, this flange will engage the contact points 76 of the levers 70. Since these levers are pivoted to the unit 24, the levers will be rocked to move the inner ends thereof toward the left as viewed in Figure 1 and transmit a reaction force to the spool valve 60, and this force is transmitted back to the brake pedal to provide the latter with the highly desirable "feel."

From the point at which reaction forces are initially transmitted to the brake pedal to the point where relatively heavy brake application is made, the reaction transmitted to the brake pedal will occur solely through the operation of the levers 70. This operation may occur, for example, up to the point where the parts reach the positions shown in Figure 2. As increasing braking pressures occur, for example near the point of "power runout" of the motor 10, that is, the point where the motor is energized to its maximum extent, further pressure applied to the brake pedal will take up the play between the spool valve 60 and the plunger 19. In the latter portions of brake application to a heavy extent, therefore, forces are directly transmitted from the brake pedal through rod 82, valve 60, and plunger 19 to assist the motor in accomplishing a maximum application of the brakes.

As soon as the brake pedal is released, the spring 81 will immediately return the valve 60 to its normal position relative to the sleeve 52. The valve element 64 will engage the seal 53 to cut off communication between the chamber 57 and the atmosphere and to connect the chamber 57 to the chamber 56 through valve groove 61. Motor pressures then will be balanced. The biasing spring 38 will then move the unit 24 back to its normal off position shown in Figure 1, and immediately upon movement of the valve 60 to its normal position, the spring 80 will move the unit 23 to the left in Figure 1 relative to the unit 24 to seat the flange 30 against the shoulders 79. Thus the entire mechanism 22 moves as a unit to the off positions of the parts.

It has been found that the utilization of a pressure responsive mechanism comprising two units such as the units 23 and 24 is highly practicable and efficient in operation, the differential pressures affecting the unit 24 being positively transmitted to the plunger 19 assisted by the cushioned transmission of forces from the unit 23 to the plunger 19 through the spring 80. The construction eliminates a separate foot operated plunger within the plunger 19 for transmitting direct hydraulic forces to the brake pedal, but the advantage of such hydraulic reaction forces is retained by the provision of the levers 70 which serve to transmit such forces to the brake pedal.

The master cylinder pressure at which the spring 80 will start to compress may be predetermined by providing a spring 80 of the desired type. Thus the levers 70 may be rendered effective for starting their operation of transmitting reaction forces to the brake pedal at any desired master cylinder pressure. It also will be apparent that the ratio of master cylinder pressures to reaction forces transmitted to the brake pedal may be determined in accordance with the lengths of the lever arms of the levers 70. It will be apparent therefore that the design of the mechanism is highly flexible for providing any desired results along the lines referred to. The diaphragm 28, of course, serves as a seal between the units 23 and 24 to render both of these units subject to differential motor pressures while at the same time providing for relative movement between these units to accomplish the results set forth.

It is to be understood that the form of the invention shown and described is to be taken as illustrative only, and that the scope of the invention is defined in the appended claims.

I claim:

1. A fluid pressure motor device comprising a motor casing having a pressure responsive unit defining therewith a variable pressure chamber, said unit comprising a pair of relatively movable sections having means connecting them in sealed relation whereby both of said sections are subject to differential pressures in said variable pressure chamber, a power transmitting member connected to one of said sections, resilient means connected between said sections and biasing them for relative movement in opposite directions to relative normal positions, a manually operable valve connected between said variable pressure chamber and sources of different pressures and having a normal position connecting said variable pressure chamber to one of said sources, said valve being operable to connect said variable pressure chamber to the other source to transmit movement from said one section to said power transmitting member and then to move the other section against said biasing means relative to said one section, and means connected between said sections and engaging said valve to react thereagainst to oppose movement thereof in a direction away from its normal position.

2. A motor device according to claim 1 wherein said means comprises lever means connected between said sections to be rocked upon relative movement therebetween, said lever means being connected to said valve to oppose movement thereof from its normal position when said relative movement takes place between said sections.

3. A motor device according to claim 1 wherein said means comprises a lever having fulcrum engagement intermediate its ends with said one section and having a radially outer end engaging the other section whereby said lever is rocked about its fulcrum upon said relative movement of said sections, said lever having a radially inner end engaging said valve to oppose movement thereof away from its normal position when said lever is rocked by said relative movement between said sections.

4. A motor device according to claim 1 wherein said one section is arranged radially inwardly of the other section, said means comprising a plurality of radial levers having fulcrum engagement with both sections to be rocked upon said relative movement of said sections, said radial levers having portions engaging said valve to oppose movement thereof away from its normal position upon said rocking of said levers.

5. A motor device according to claim 1 wherein said sealing engagement between said sections is provided by an annular diaphragm connected at its radially inner and outer peripheries with the respective sections, and interengaging means carried by said sections for limiting said relative movement therebetween to said relative normal positions.

6. A fluid pressure motor device comprising a casing having a pressure responsive unit dividing said casing to form a constant pressure chamber and a variable pressure chamber the former of which is connected to one source of pressure, said unit comprising a radially inner section and a radially outer section, an annular diaphragm having inner and outer edge portions sealed respectively to said inner and outer sections, a power transmitting member connected to said inner section, a valve carried by said pressure responsive unit and having connection with said variable pressure chamber and with said one source of pressure and with a source of different pressure and normally connecting said variable pressure chamber to said one source, said valve being manually operable to move it from said normal position to an operative position connecting said variable pressure chamber to said source of different pressure, a spring engaging at its ends against said sections to bias said outer section relatively toward said variable pressure chamber and to bias said inner section in the other direction, said sections having interengaging portions limiting such relative movement of said sections, said spring being tensioned to provide for movement of said radially outer section relative to said radially inner section in the direction of said constant pressure chamber after a predetermined resistance to movement of said power transmitting member has developed, and means connected to said sections and to said valve and movable upon said last-named movement of said radially outer section to oppose movement of said valve away from its normal position.

7. A motor device according to claim 6 wherein said means comprises a plurality of radial levers having fulcrum engagement intermediate their ends with said inner section, each lever having a radially outer end engaging said outer section and a radially inner end engaging said valve.

8. A motor device according to claim 6 wherein said means comprises a plurality of radial levers having fulcrum engagement intermediate their ends with said inner section, each lever having a radially outer end engaging said outer section and a radially inner end engaging said valve, said inner section comprising a body having radial slots in which said levers are arranged to confine them against circumferential movement relative to said inner section, said inner section having a plate, said spring engaging said plate and said radially outer section.

9. A fluid pressure motor device comprising a motor casing, a pressure responsive unit in said casing dividing it into chambers, said unit comprising a radially inner section, a power transmitting member connected to said radially inner section and a radially outer section having a radially inwardly extending flange, a spring engaging at opposite ends against said inner and outer sections to bias the latter in one direction relative to said inner section, said inner section having a shoulder engageable with said flange to limit such movement of said outer section, a diaphragm having radially inner and outer peripheries sealed to said inner and outer sections respectively, a valve having a normal position connecting said motor chambers to each other and from which position it is movable to disconnect said chambers and connect one of said chambers to a source of pressure to move said unit, the tension of said spring being such that when predetermined resistance to movement of said power transmitting member occurs, said outer section will move in the other direction relative to said inner section, and means connected to said sections and to said valve for utilizing the last-named movement of said outer section for opposing movement of said valve away from its normal position.

10. A motor device according to claim 9 wherein said means comprises a plurality of radial levers each fulcrumed intermediate its ends on said inner section, each lever having a radially outer end engaging said flange and a radially inner end engaging said valve.

References Cited in the file of this patent

UNITED STATES PATENTS

| | | |
|---|---|---|
| 2,197,075 | Fitzgerald | Apr. 16, 1940 |
| 2,307,910 | Baade | Jan. 12, 1943 |
| 2,685,170 | Price | Aug. 3, 1954 |